United States Patent [19]

Hylla

[11] 4,438,913

[45] Mar. 27, 1984

[54] PISTOL MAINTENANCE DEVICE

[76] Inventor: Gary F. Hylla, 1709 Spruce St., Peru, Ill. 61354

[21] Appl. No.: 423,296

[22] Filed: Sep. 24, 1982

[51] Int. Cl.[3] .......... B23Q 3/18

[52] U.S. Cl. .......... 269/60; 269/76; 269/203; 269/246; 269/296; 248/534

[58] Field of Search .......... 269/45, 76, 902, 60, 269/205, 246, 296–299, 301, 303; 248/538, 534; 73/167

[56] References Cited

U.S. PATENT DOCUMENTS

| | | | |
|---|---|---|---|
| 568,543 | 9/1896 | Parks | 269/45 |
| 842,007 | 1/1907 | Parker | 269/45 |
| 1,067,667 | 7/1913 | Lynch | 269/203 |
| 2,427,365 | 9/1947 | Meister | 269/296 |
| 2,458,370 | 1/1949 | Geddes | 269/45 |
| 2,645,050 | 7/1953 | Golias | 248/538 |
| 2,731,829 | 1/1956 | Wigington et al. | 73/167 |
| 2,748,459 | 6/1956 | Orr | 269/296 |
| 2,908,403 | 10/1959 | Browder et al. | 269/296 |
| 3,024,653 | 3/1962 | Broadway | 73/167 |
| 3,343,411 | 9/1967 | Lee | 73/167 |
| 3,883,128 | 5/1975 | Breese | 269/45 |
| 4,156,982 | 6/1979 | Phillips | 248/538 |

*Primary Examiner*—Robert C. Watson

*Attorney, Agent, or Firm*—Merriam, Marshall & Bicknell

[57] ABSTRACT

A handgun holding device having a baseplate and a pair of angle brackets rigidly mounted on the baseplate to rigidly engage opposite sides of the handgun's handgrip to maintain the handgun in position during cleaning or repair while allowing ready access to all regions of the handgun. Other preferred embodiments include handgun holding devices having lateral support brackets for rigidly engaging opposite sides of the handgrip, and barrel supports mounted to the baseplate to supportably engage the handgun's barrel.

12 Claims, 5 Drawing Figures

PISTOL MAINTENANCE DEVICE

BACKGROUND OF THE INVENTION

The present invention relates generally to firearm maintenance devices, and more particularly to devices for maintaining a handgun in position during cleaning or repair of the handgun.

Firearms, including handguns. require periodic maintenance to insure that the firearm functions properly. The various metal parts of the weapon must be checked for rust or corrosion which might interfere with their operation. The non-corrosive gunpowder used in most modern handgun ammunition leaves behind a powder residue and the projectile generates metal foulings when the ammunition is fired, requiring periodic cleaning of the handgun chamber and barrel regions to prevent the accumulation of these debris which might impede the bullet's exit from the weapon. The various parts of the handgun must also be examined regularly to determine whether they are worn out and should be replaced. In addition, certain handguns have special finishes and decorative features which may require special maintenance.

The generally accepted procedure for minor repair of a handgun includes the initial step of partial dismantling of the handgun. This dismantling step, commonly referred to as "field stripping," involves removal of some of the major components of the handgun (cylinder, trigger and hammer assemblies of revolver-type handguns; magazine and slide assemblies of automatic handguns) from the handgun's frame. Field stripping is performed by holding the handgun frame in one hand while removing the aforementioned components with the other hand, generally without the aid of tools. More extensive cleaning requires access to all regions of the handgun and includes further dismantling of the handgun into its basic components with the assistance of tools. Major repair work, including the replacement of certain handgun parts, also involves the use of tools, the operation of which may cause the handgun to be subjected to significant forces which increase the difficulty of holding the handgun in position. Certain large-calibre handguns are hard to hold in one hand during cleaning or repair, due to their overall size and weight. The presence of bulky accessories such as telescopic sights mounted on the handgun increase the problems of maintaining the handgun in a position during cleaning or repair.

Of interest to the background of the present invention are the following reports of handgun machine rests intended to maintain a handgun in position during firing for testing the accuracy of the handgun or its ammunition: Lea, U.S. Pat. No. 2,458,608; Wigington, et al., U.S. Pat. No. 2,731,829; Broadway, U.S. Pat. No. 3,024,653; and Lee, U.S. Pat. No. 3,343,411.

Of particular interest to the present invention is the fact that no handgun maintenance devices have been reported in which a handgun may be held in a position allowing ready access to all desired cleaning or repair regions of the handgun. The aforementioned patents show machine rests directed toward holding a handgun in position during firing and restoring the weapon to the same position after each shot is fired. The holding means for these reported machine rests comprise clamping the handgrip region to support posts or between clamping plates, thus preventing ready access to the desired handgrip region and the handgun components located therein such as the trigger spring of revolvers or magazine receivers of automatic handguns. The machine rests also include various repositioning mechanisms which serve no particular cleaning or repair function.

There exists, therefore, a long-standing need in the art for a simple, inexpensive handgun maintenance device for maintaining a handgun in position during cleaning or repair and which allows ready access to substantially all desired regions for cleaning and repair of the handgun.

BRIEF SUMMARY

The present invention provides a novel handgun holding device for maintaining a handgun in position during cleaning or repair and allowing ready access to substantially all desired regions of the handgun.

The holding device according to the invention is adapted to maintain a variety of different size handguns in position, including single action, revolver, and automatic-type handguns, both with and without accessories such as telescopic sights mounted on the handguns.

A presently preferred embodiment of the present invention includes a handgun holding device in which the handgun is maintained in a cleaning position by its handgrip region positioned upon a baseplate by a pair of angle brackets mounted on the baseplate and adapted to rigidly engage opposite sides of the handgrip region.

A second presently preferred embodiment according to the present invention includes a handgun holding device comprising a pair of angle brackets mounted upon a baseplate and rigidly engaging opposite sides of the handgrip region positioned upon the baseplate at the cleaning position and a barrel support member mounted upon said baseplate supportably engaging the handgun's barrel region.

Also comprehended by the present invention are handgun holding devices including lateral handgrip support members rigidly mounted to the baseplate for rigid engagement of the remaining sides of the handgrip. The present invention also comprehends handgun holding devices wherein at least one of the angle brackets is adjustably mounted as to position on the baseplate.

Numerous aspects and advantages of the present invention will become apparent upon consideration of the following detailed description, along with the accompanying drawings.

DETAILED DESCRIPTION

Figure 1:
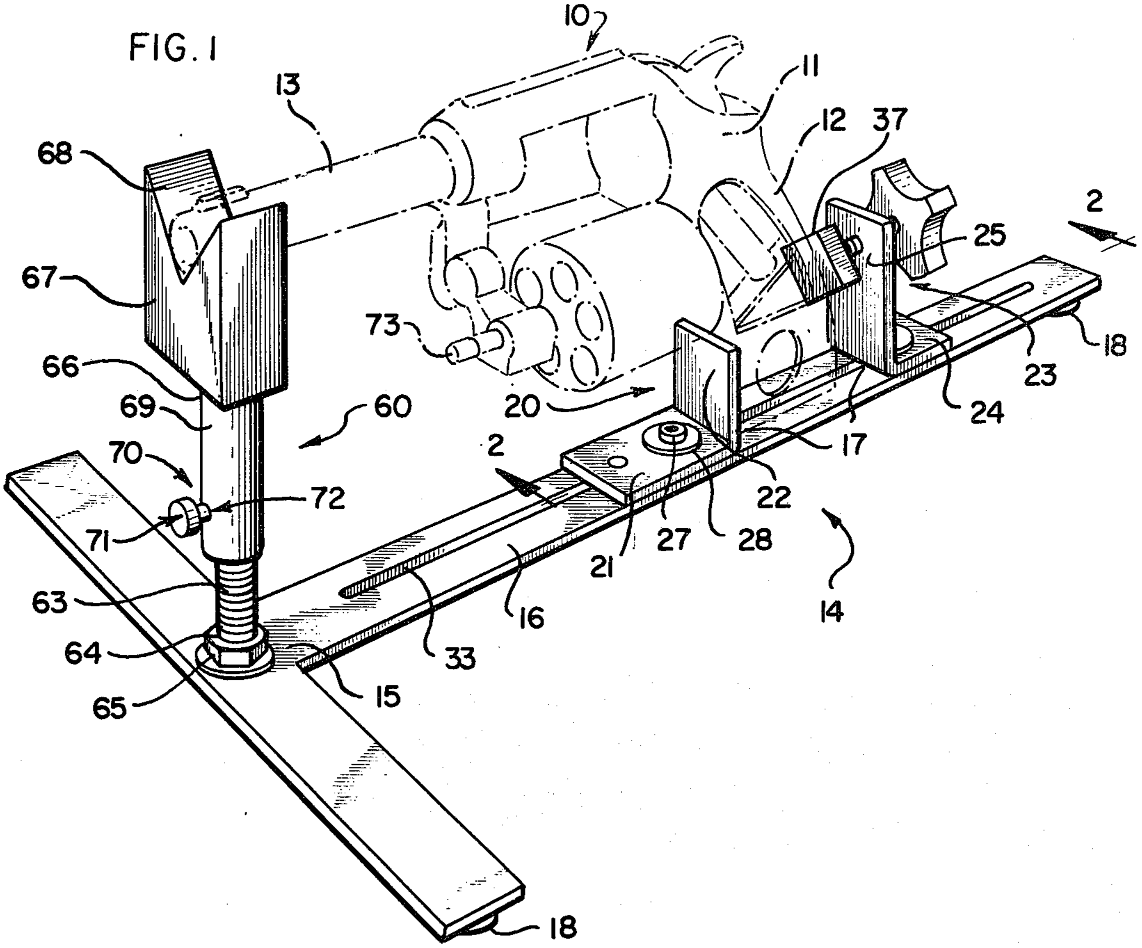
FIG. 1 is a perspective view of one embodiment of a handgun holding device in accordance with the present invention and showing a revolver-type handgun in dashed lines, with handgun sidegrips removed, maintained in a cleaning position by the device.
Figure 2:
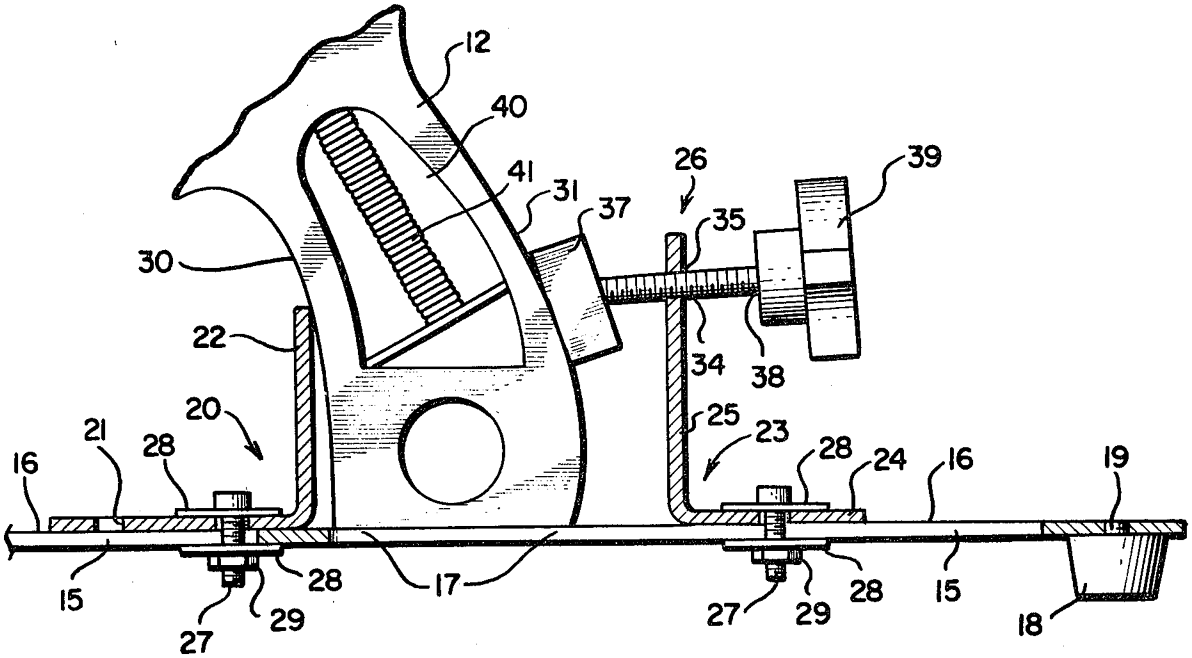
FIG. 2 is a fragmentary sectional elevational view of the cleaning position taken along section line 2—2 of FIG. 1.

Referring in detail to the drawings, and more particularly to FIGS. 1–2 of the drawings, a conventional revolver-type handgun 10 includes a frame 11 including a handgrip 12 and a barrel 13.

According to the present invention there is provided a handgun holding device 14 comprising a baseplate 15 having an upper surface 16 upon which a handgrip 12 is positionable at a cleaning position 17. Baseplate 15 may be constructed of any suitable material providing an upper surface upon which the handgrip may be positioned, and as illustrated here consists of two flat metal bands welded together to form a flat T-shaped base, with rubber pads 18 attached by rivets 19, or other suitable fasteners, to the bottom of the metal bands at their outer ends to form a stable base.

Also mounted upon baseplate 15 at cleaning position 17, and best illustrated by FIG. 2, are a first angle bracket 20 including a first portion 21 rigidly mounted to upper surface 16 of baseplate 15 and a second upstanding portion 22 rigidly engaging one side 30 of handgrip 12; and a second angle bracket 23 including a first portion 24 rigidly mounted to upper surface 16 of baseplate 15 and a second upstanding portion 25 engaged by an adjustable holding means 26 rigidly engaging other side 31 of handgrip 12. The angle brackets illustrated here are constructed of flat metal bands bent into a roughly 90° L-shaped configuration, but may be constructed of other suitably rigid material of various configurations providing portions adapted to rigidly engage baseplate 15 and handgrip 12, and engaging adjustable holding means 26. First angle bracket 20 and second angle bracket 23 are rigidly attached to baseplate 15 by their respective first portions 21 and 24 at cleaning position 17 by suitable fastening means such as threaded bolts 27 inserted through holes or longitudinal slots in the respective first portions of the angle brackets, then through holes or a longitudinal slot 33 in baseplate 15 and through appropriately sized washers 28, and threadably engaging locking nuts 29. The presence of longitudinal slot 33 in baseplate 15 allows adjustable positioning of first angle bracket 20 or second angle bracket 23 or both angle brackets along baseplate 15 by loosening or tightening threaded bolts 27 and locking nuts 29 after positioning the brackets along the longitudinal slot. Angle bracket 20 and baseplate 15 may be covered with non-abrasive plastic coatings such as vinyl chloride to prevent scratching or marring of handgrip 12 at the areas of engagement with bracket 20 and baseplate 15. Alternatively, baseplate 15 and first angle bracket 20 may be constructed of material such as strong plastic capable of rigidly engaging the handgrip without damaging the finish of handgrip 12. First angle bracket 20 may also have a resilient pad 74 attached to second portion 22 to enhance engagement with one side 30 of the handgrip as shown in FIG. 1. Resilient pad 74 may not be needed where one side 30 is substantially vertical, providing an area of suitable engagement for the second upstanding portion of angle bracket 20.

Adjustable holding means 26 threadably engaging upstanding portion 25 of second bracket 23 includes a threaded member 34 threaded through and threadably engaging a drilled and tapped hole 35 in upstanding portion 25 with one end 36 of threaded member 34 in swivel engagement with a resilient pad 37 adapted to engage and substantially conform to other side 31 of handgrip 12. Resilient pad 37 consists of a resilient material such as ultra-high molecular weight polyethylene adapted to rigidly engage other side 31 of handgrip 12 without scratching or marring the finish of handgrip 12. The other end 38 of adjustable holding means 26 includes a knob 39 rigidly engaging threaded member 34 for turning threaded member 34 in hole 35 and thereby adjusting the position of resilient pad 37. Suitable adjustable holding means 26 may be purchased from Reid Tool Supply Company (Muskegon, Michigan), although it is to be understood that other adjustable holding means employing ratchet mechanisms or other extendably adjustable means could be mounted on upstanding portion 25.

According to one presently preferred embodiment of the present invention, best illustrated by FIG. 2, handgun 10 is rigidly maintained in position by handgun holding device 14 by handgrip 12 as follows. The sidegrips are first removed from the handgrip regions to allow access to an interior handgrip region 40 including a trigger spring 41. Handgrip 12 is then positioned on upper surface 16 of baseplate 15 at cleaning position 17 between first angle bracket 20 and second angle bracket 23 rigidly mounted to baseplate 15, and upper portion 22 of first angle bracket 20 is then brought into rigid engagement with one side 30 of handgrip 12. Adjustable holding means 26 engaging upper portion 25 of second bracket 23 is threadably adjusted inward toward other side 31 of handgrip 12 by rotating knob 39 until resilient pad 37 rigidly engages other side 31 of handgrip 12. Handgun 10 is now rigidly held in position allowing ready access to interior handgrip region 40 as well as barrel region 13 and the remainder of the handgun, so that these regions and corresponding handgun components may be readily cleaned or repaired.

Figure 3:
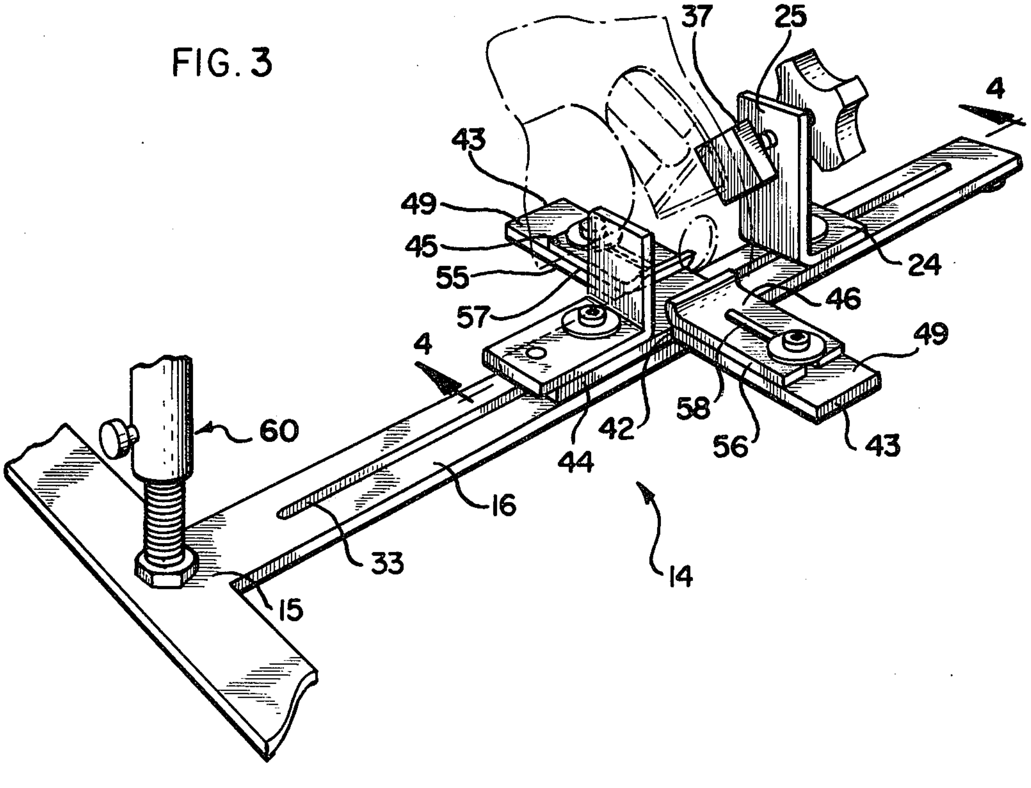
FIG. 3 is an elevated fragmentary perspective view of a second embodiment of a handgun holding device in accordance with the present invention, including lateral support members, and showing a fragmentary revolver-type handgun handgrip in dashed lines at the cleaning position.
Figure 4:
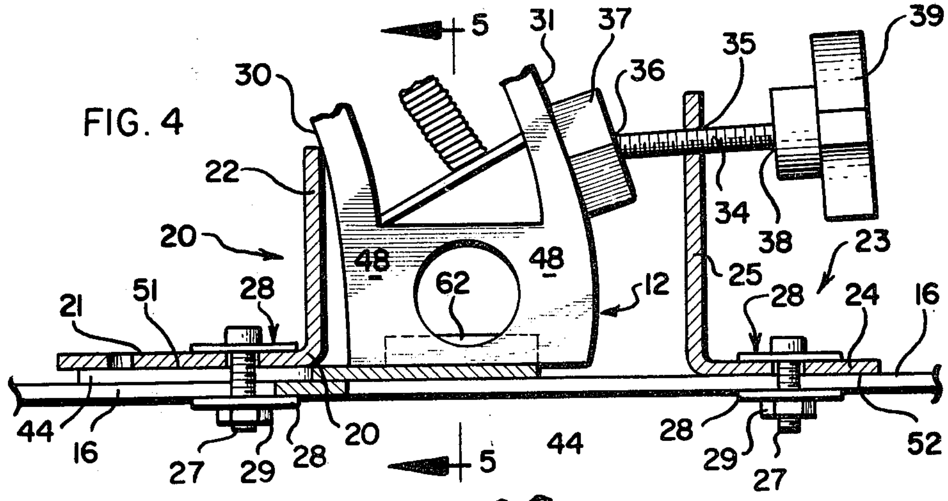
FIG. 4 is a fragmentary sectional elevational view of the handgun holding device of FIG. 3 at the cleaning position, including lateral support members, taken along section line 4—4 of FIG. 3.
Figure 5:
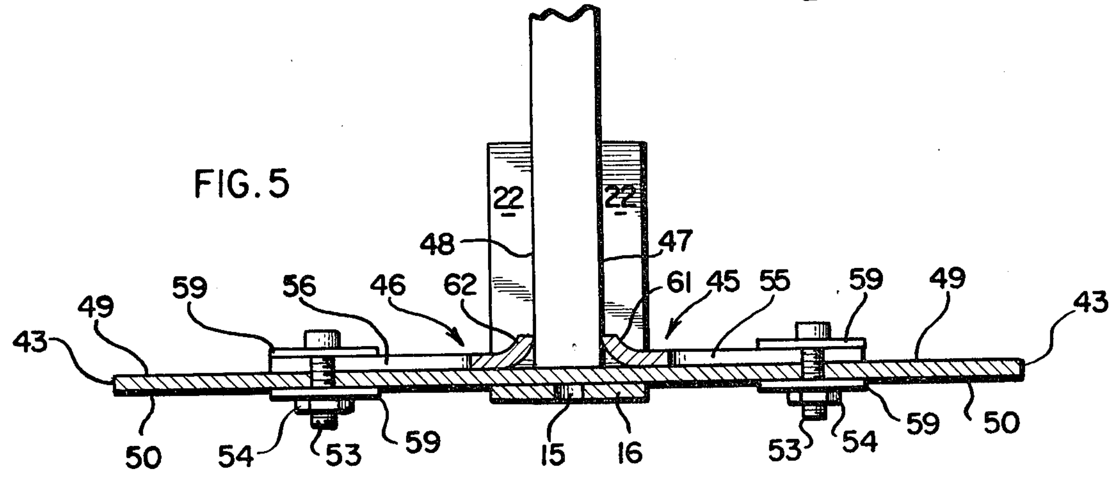
FIG. 5 is a fragmentary sectional elevational view taken along section line 5—5 of FIG. 4.

According to a second embodiment of the invention, best illustrated by FIGS. 3, 4 and 5, handgun holding device 14 includes lateral support members 45 and 46 rigidly mounted to a cross member 43 of a T-shaped member 42 rigidly engaged to upper surface 16 of baseplate 15 by a longitudinal member 44 extending from cross-member 43 to provide rigid engagement with the respective remaining sides 47 and 48 of handgrip 12. T-shaped member 42 may be constructed of metal bands welded together to provide an upper surface 47 upon which handgrip 12 is positionable and lower surface 50 positionable on baseplate 15, and may be coated with non-abrasive material such as vinyl chloride to prevent scratching or marring of handgrip 12, or may be constructed of strong, non-abrasive plastic or other strong, non-abrasive material.

T-shaped member 42 is rigidly mounted to baseplate 15, as best illustrated by FIG. 4, by sandwiching longitudinal member 44 between upper surface 16 of baseplate 15 and lower surface 51 of first portion 21 of first angle bracket 20. Alternatively, longitudinal portion 44 may be rigidly engaged between upper surface 16 of baseplate 15 and lower surface 52 of first portion 24 of second angle bracket 23. Longitudinal member 44 has a hole or groove through which fastening means such as a bolt 27 is inserted after being inserted through a washer 28 and a similar hole or groove in the angle bracket, and which bolt 27 is then inserted through baseplate 15 through a hole or longitudinal groove 33, another washer 28, and threadably engages a locking nut 29.

Respective lateral support members 45 and 46 are similarly rigidly mounted by their respective first portions 55 and 56 to respective opposite ends of cross-member 43, best shown in FIGS. 3 and 5, by fastening means such as threaded bolts 53 inserted through respective grooves 57 and 58 of lateral support members 45 and 46, and secured by locking nuts 54 threadably engaging bolts 53, which have also been inserted through appropriately sized washers 59. Respective lateral support members 45 and 46 may be positioned by loosening or tightening fastening means 53 so that their respective second portions including upturned legs 61 and 62 rigidly engage remaining respective opposite sides 47 and 48 of handgrip 12. The lateral support members may be metal coated with a non-abrasive material such as vinyl chloride, or may be constructed of rigid, non-abrasive plastic or other material to prevent scratching or marring of the finish of handgrip 12.

Handgun 10 is positioned by handgrip 12 on cross-member 43 and on longitudinal member 44 rigidly mounted to baseplate 15 between baseplate 15 and either first angle bracket 20 or second angle bracket 23 and appropriate adjustments made to the angle bracket not engaging longitudinal member 44 and respective lateral supports 45 and 46 to rigidly engage the remaining sides of handgrip 12.

According to another preferred embodiment of the present invention, best shown by FIG. 1, the handgun holding device includes the aforementioned baseplate 15 and first angle bracket 20 rigidly mounted to baseplate 15 and adapted to rigidly engage one side 30 of handgrip 12 and second angle bracket 23 rigidly mounted to baseplate 15 and adapted to rigidly engage other side 31 of handgrip 12 and a barrel support 60 adapted to supportably engage barrel 13 of handgun 10. Barrel support 60 includes a threaded member 63 having one end 64 inserted through a hole or groove 33 in baseplate 15 and secured to baseplate 15 by a suitable means such as locking nut 65 or locking nuts threadably engaging one end 64 on opposite sides of baseplate 15, thereby mounting barrel support 60 on baseplate 15 in substantial alignment with longitudinal slot 33. Other end 66 of threaded member 63 supportably engages a pillow block 67 having a V-shaped groove 68 adapted for supportably nesting barrel 13 therewithin. Pillow block 67 is positionably adjustable along threaded member 63 by a sleeve member 69 attached to pillow block 67 and including a locking means 70 for positionably engaging threaded member 63.

It is to be noted that although the described barrel support 60 includes threaded member 63 and sleeve 69 inserted over threaded member 63 and positionable by locking means 70 which includes thumb screw 71 threadably engaging a drilled and tapped hole 72 through sleeve 69 allowing the end of thumb screw 71 inserted in hole 72 to rigidly engage threaded member 63, other suitable positionably adjustable support members could be used to support pillow block 67 and be mounted to baseplate 15.

Pillow block 67 may be constructed of a resilient material such as ultra high molecular weight polyethylene or other substances capable of supporting engaging barrel 13 without scratching or marring the barrel's finish.

Handgun 10 is maintained in position according to this embodiment of the invention as follows. Barrel support 60 is lowered to its lowest point, and adjustable holding means 26 is adjusted until resilient pad 37 touches second upward portion 25 of second angle bracket 23. The sidegrips are removed from handgrip 12 and handgrip 12 is placed at cleaning position 17 upon baseplate 15 between first angle bracket 20 and second angle bracket 23 with barrel 13 in substantial longitudinal alignment with longitudinal slot 33 in the direction of barrel support 60. Angle brackets 20 and 23 are positioned along longitudinal slot 33 by their respective fastening means after visually gauging the distance at which barrel support 60 will engage barrel 13 without interfering with the access to other components of the handgun such as a cylinder ejector arm 73 as shown in FIG. 1. Pillow block 67 is then positionably adjusted to supportably engage barrel 13 by locking means 70. First angle bracket 20 is then brought into rigid engagement with one side 30 of handgrip 12 and the second angle bracket's adjustable holding means 26 is adjusted inwardly until resilient pad 37 rigidly engages other side 31 of handgrip 12. Handgun 10 is thus securely held in position by handgrip 12 and barrel 13 by handgun holding device 14 and all regions of the handgun are readily accessible for cleaning or repair.

Another embodiment of the invention, best illustrated by FIG. 3, includes the use of lateral support members 45 and 46 mounted on T-shaped member 42 to maintain handgun 10 in position, in addition to angle brackets 20 and 23, and barrel support 60. Handgun 10 may easily be so positioned by following the above-described procedures and including adjustments to account for the positioning of pillow block 67 to supportably engage barrel 13.

Numerous modifications and variations of the invention as illustrated above and in the drawing are expected to occur to those skilled in the art. As one example, the above description illustrates a handgun holding device wherein one or both angle brackets may be adjustably mounted as to position along a longitudinal slot in the baseplate. Similarly, the barrel support could also be positionably mounted on the baseplate and still provide adequate accommodation for various size handguns. Consequently, only those limitations that appear in the appended claims should be placed on the invention as above described.

What is claimed is:

1. A handgun holding device for maintaining a handgun having a handgrip and barrel in position by the handgrip and barrel during maintenance, comprising:

a baseplate having a longitudinal slot, said handgrip positionable thereon at a cleaning position adjacent to said longitudinal slot with said barrel extending in substantial alignment with said longitudinal slot;

a pair of angle brackets mounted upon said baseplate at the cleaning position including first and second angle brackets rigidly mounted to said baseplate through said longitudinal slot, said first angle bracket abutting one side of the handgrip;

an adjustable holding means engaging said second angle bracket and adjustably extendible therefrom to rigidly engage the other side of the handgrip opposite to said one side, thereby rigidly maintaining the handgrip in position between said adjustable holding means and said first angle bracket;

a barrel support member having one end mounted on said baseplate in substantial alignment with said longitudinal slot and the other end supportably engaging said barrel while allowing ready access to all desired cleaning or repair regions of the handgun;

wherein said barrel support member comprises a support member with one end engaging said baseplate and a top end extending upwardly from the baseplate, said top end including a pillow block having surfaces contoured to supportably nest said barrel therewithin.

2. A handgun holding device according to claim 1 wherein said pillow block includes means for positionably engaging said support member.

3. A handgun holding device according to claim 2 wherein said means for positionably engaging said support member includes a locking means for positionably engaging said support member and thereby locking said pillow block into position with respect to said support member.

4. A handgun device according to claim 3 including a T-shaped member having a cross-member and a longitudinal member extending therefrom, said longitudinal member rigidly mounted on said baseplate; and further including respective lateral handgrip support members having respective first and second portions, said respective first portions of said lateral handgrip support rigidly mounted to opposite ends of said cross-member and said respective second portions of said lateral handgrip support members rigidly engaging the remaining opposite sides of the handgrip.

5. A handgun holding device according to claim 4 wherein said respective second portions of said lateral handgrip supports have upturned legs for rigid engagement of the remaining opposite sides of the handgrip.

6. A handgun holding device according to claim 3 wherein at least one of said pair of said angle brackets is adjustably mounted through said longitudinal slot for positioning along said slot.

7. A handgun holding device for maintaining a handgun having a handgrip and barrel in position by the handgrip and barrel during maintenance, comprising:

a baseplate having a longitudinal slot, said handgrip positionable thereon at a cleaning position adjacent to said longitudinal slot with said barrel extending in substantial alignment with said longitudinal slot;

a pair of angle brackets mounted upon said baseplate at the cleaning position including first and second angle brackets rigidly mounted to said baseplate through said longitudinal slot, said first angle bracket abutting one side of the handgrip;

an adjustable holding means engaging said second angle bracket and adjustably extendible therefrom to rigidly engage the other side of the handgrip opposite to said one side, thereby rigidly maintaining the handgrip in position between said adjustable holding means and said first angle bracket;

a barrel support member having one end mounted on said baseplate in substantial alignment with said longitudinal slot and the other end supportably engaging said barrel while allowing ready access to all desired cleaning or repair regions of the handgun;

wherein said baseplate comprises a T shape member having a longitudinal portion and a cross portion, said longitudinal portion having a longitudinal slot therein, and wherein said barrel support member comprises a threaded member with a locking nut means threadably engaging one end of the threaded member to said baseplate and a pillow block at the other end having a V-shaped groove to supportably nest said barrel therewithin.

8. A handgun holding device according to claim 7 wherein said pillow block includes a sleeve positionably engaging said threaded member.

9. A handgun holding device according to claim 8 wherein said sleeve includes a locking member for positionably engaging said threaded member and thereby locking said pillow block into position with respect to said threaded member.

10. A handgun device according to claim 9 including a T-shaped member having a cross member and a longitudinal member extending therefrom, said longitudinal member rigidly mounted on said baseplate; and further including respective lateral handgrip support members having respective first and second portions, said respective first portions of said lateral handgrip support members rigidly mounted to opposite ends of said cross- member and said respective second portions of said lateral handgrip support members rigidly engaging the remaining opposite sides of the handgrip.

11. A handgun holding device according to claim 10 wherein said respective second portions of said lateral handgrip supports have upturned legs for rigid engagement of the remaining opposite sides of the handgrip.

12. A handgun holding device according to claim 9 wherein at least one of said pair of said angle brackets is adjustably mounted through said longitudinal slot for positioning along said slot.

* * * * *

UNITED STATES PATENT AND TRADEMARK OFFICE
CERTIFICATE OF CORRECTION

PATENT NO. : 4,438,913

DATED : March 27, 1984

INVENTOR(S) : Gary F. Hylla

It is certified that error appears in the above-identified patent and that said Letters Patent are hereby corrected as shown below:

Column 4, line 41, "cross member" is rewritten as --cross-member--.

Column 4, line 47, "47" is deleted and replaced with --49--.

Column 5, line 62, "supporting" is deleted and replaced with --supportably--.

Claim 4, Column 7, line 23, after "hand grip support insert --members--.

Claim 7, Column 8, line 11, "T shape" is rewritten as --T-shape--.

Claim 10, Column 8, line 29, "cross member" is rewritten as --cross-member--.

Signed and Sealed this

*Nineteenth* Day of *June 1984*

[SEAL]

*Attest:*

GERALD J. MOSSINGHOFF

*Attesting Officer* *Commissioner of Patents and Trademarks*